(12) United States Patent
Takebayashi

(10) Patent No.: US 11,862,788 B2
(45) Date of Patent: Jan. 2, 2024

(54) NON-AQUEOUS ELECTROLYTE SECONDARY BATTERY

(71) Applicant: TOYOTA JIDOSHA KABUSHIKI KAISHA, Toyota (JP)

(72) Inventor: Yoshitomo Takebayashi, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 90 days.

(21) Appl. No.: 17/374,232

(22) Filed: Jul. 13, 2021

(65) Prior Publication Data
US 2022/0085354 A1    Mar. 17, 2022

(30) Foreign Application Priority Data

Sep. 16, 2020   (JP) ................. 2020-155589

(51) Int. Cl.
*H01M 4/00*    (2006.01)
*H01M 4/36*    (2006.01)
(Continued)

(52) U.S. Cl.
CPC ....... *H01M 4/364* (2013.01); *H01M 10/0525* (2013.01); *H01M 2004/027* (2013.01); *H01M 2004/028* (2013.01)

(58) Field of Classification Search
CPC ............. H01M 2/1094; H01M 220/20; H01M 2/1077; H01M 2220/20; H01M 4/364
See application file for complete search history.

(56) References Cited

U.S. PATENT DOCUMENTS

| 2005/0118508 A1 | 6/2005 | Yong et al. |
| 2007/0224493 A1 | 9/2007 | Higuchi et al. |

(Continued)

FOREIGN PATENT DOCUMENTS

| JP | 2007-510267 A | 4/2007 |
| JP | 2007-258050 A | 10/2007 |

(Continued)

OTHER PUBLICATIONS

Mizutani, Nonaqueous Electrolyte Secondary Battery, Jun. 2015 See the Abstract. (Year: 2015).*

(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

A non-aqueous electrolyte secondary battery, in which a positive electrode includes a positive electrode mixture layer in which a mixture containing a positive electrode active material is formed and a positive electrode mixture layer non-forming portion in which the positive electrode mixture layer is not formed, and a negative electrode includes a negative electrode mixture layer in which a mixture containing a negative electrode active material is formed and a negative electrode mixture layer non-forming portion in which the negative electrode mixture layer is not formed. At least one of the positive electrode mixture layer non-forming portion and the negative electrode mixture layer non-forming portion has a resin portion substantially formed of a swellable resin having a property of swelling the non-aqueous electrolyte.

5 Claims, 3 Drawing Sheets

(51) Int. Cl.
*H01M 10/0525* (2010.01)
*H01M 4/02* (2006.01)

(56) References Cited

U.S. PATENT DOCUMENTS

2014/0255778 A1  9/2014  Huh et al.
2018/0233721 A1*  8/2018  Herrmann ......... H01M 10/0418

FOREIGN PATENT DOCUMENTS

| | | | | |
|---|---|---|---|---|
| JP | 2009-134915 A | | 6/2009 | |
| JP | 2010-27329 A | | 2/2010 | |
| JP | 2015103302 A | * | 6/2015 | |
| JP | 2016-115593 A | | 6/2016 | |
| JP | 2018-137101 A | | 8/2018 | |
| JP | 2018133323 A | * | 8/2018 | ............. H01G 11/70 |
| JP | 2019-160553 A | | 9/2019 | |
| KR | 10-1586530 B1 | | 1/2016 | |
| WO | 2005/045957 A1 | | 5/2005 | |

OTHER PUBLICATIONS

Akiyama, Nickel metal hydride battery, Mar. 2020, See the Abstract. (Year: 2020).*

* cited by examiner

NON-AQUEOUS ELECTROLYTE SECONDARY BATTERY

CROSS-REFERENCE TO RELATED APPLICATION

This application claims priority to Japanese Patent Application No. 2020-155589 filed on Sep. 16, 2020, incorporated herein by reference in its entirety.

BACKGROUND

1. Technical Field

The present disclosure relates to a non-aqueous electrolyte secondary battery. Specifically, the present disclosure relates to a non-aqueous electrolyte secondary battery having a resin portion formed of a swellable resin on a current collector.

2. Description of Related Art

A non-aqueous electrolyte secondary battery, such as a lithium-ion secondary battery, is lightweight and has a high energy density as compared with the existing batteries. Therefore, in recent years, such a non-aqueous electrolyte secondary battery is used as a power source mounted on a vehicle using an electricity as a drive source, or a power source mounted on an electronic product, such as a personal computer, a mobile terminal. In particular, the lithium-ion secondary battery that is lightweight and has a high energy density is preferably used as a high-output power source for driving a vehicle, such as an electric vehicle (EV), a plug-in hybrid vehicle (PHV), or a hybrid vehicle (HV).

By the way, the non-aqueous electrolyte secondary battery used as the power source for driving the vehicle needs to be charged or discharged with a large current in a short time. Therefore, the power source for driving the vehicle is requested to have excellent rapid charge and discharge characteristic (that is, high rate characteristic). Further, the non-aqueous electrolyte secondary battery needs to be mounted on the vehicle and continuously exhibit stable performance even in a case where the charge and discharge cycle is repeated for a long period of time. Therefore, the power source for driving the vehicle is requested to have excellent durability against the rapid charge and discharge (that is, high rate resistance).

Various approaches have been attempted to improve these characteristics. One such approach is to improve a separator sheet used in the non-aqueous electrolyte secondary battery. Japanese Unexamined Patent Application Publication No. 2016-115593 (JP 2016-115593 A) discloses a technique of increasing an amount of the non-aqueous electrolyte held in a center portion of a wound electrode body and suppressing the temperature rise of the center portion of the wound electrode body by adjusting a solubility parameter of a binder contained in the heat resistant layer disposed on the separator sheet.

SUMMARY

By the way, in a case where a high rate charge and discharge cycle is applied to the non-aqueous electrolyte secondary battery that includes a sheet-shaped electrode body, the temperatures of the electrode body and the non-aqueous electrolyte held in the electrode body rise. In a case where the temperature of the non-aqueous electrolyte rises, a part of the non-aqueous electrolyte flows out of the electrode body due to thermal expansion, and as a result, the internal resistance may be increased and the high rate resistance may be decreased. By suppressing the temperature rise of the center portion of the wound electrode body, the amount of the non-aqueous electrolyte held in the center portion can be improved, but the outflow of the non-aqueous electrolyte from the end portion cannot be sufficiently suppressed. Further development of technique is desired in order to improve the high rate resistance of the non-aqueous electrolyte secondary battery.

The present disclosure provides a non-aqueous electrolyte secondary battery having excellent high rate resistance.

The present inventors have found that in a case where a portion in which a mixture containing an active material corresponding to a positive electrode and a negative electrode is formed on a current collector is defined as a mixture layer, by forming a resin portion formed of a resin having a property of swelling the non-aqueous electrolyte (hereinafter, referred to as swellable resin) in a portion in which the mixture is not formed (hereinafter, referred to as mixture layer non-forming portion), the temperature rise of the end portion of the electrode body can be suppressed. Further, the present inventors have found that the non-aqueous electrolyte can be suitably held in the electrode body by suppressing the temperature rise in the end portion of the electrode body, and as a result, the high rate resistance can be improved.

That is, a non-aqueous electrolyte secondary battery according to an aspect of the present disclosure includes an electrode body, and a non-aqueous electrolyte. The electrode body has a structure in which a plurality of positive electrodes and negative electrodes are stacked via a separator. The positive electrode includes a positive electrode mixture layer in which a mixture containing a positive electrode active material is formed and a positive electrode mixture layer non-forming portion in which the positive electrode mixture layer is not formed. The negative electrode includes a negative electrode mixture layer in which a mixture containing a negative electrode active material is formed and a negative electrode mixture layer non-forming portion in which the negative electrode mixture layer is not formed. At least one of the positive mixture layer non-forming portion and the negative electrode mixture layer non-forming portion has a resin portion substantially formed of a swellable resin having a property of swelling the non-aqueous electrolyte.

With such a configuration, a thermal capacity of the end portion of the electrode body can be increased, and as a result, the high rate resistance of the non-aqueous electrolyte secondary battery can be improved.

The resin portion may be formed along the corresponding mixture layer. With such a configuration, the thermal capacity of the end portion of the electrode body can be more uniformly improved, and the effect of the technique disclosed herein can be exhibited at a higher level.

A thermal capacity of the resin portion may be 10 J/(kg·K) or more per unit weight (kg) of the corresponding mixture layer. With such a configuration, the thermal capacity of the end portion of the electrode body can be suitably increased, and the high rate resistance of the non-aqueous electrolyte secondary battery can be improved.

The resin portion may contain polyvinylpyrrolidone, styrene-butadiene rubber, and an acrylic resin. By containing a resin having high swelling property in the resin portion, the thermal capacity of the end portion of the electrode body can be more suitably increased, and the high rate resistance of the non-aqueous electrolyte can be improved.

The resin portion may be formed at least in the negative electrode mixture layer non-forming portion. By providing the resin portion on the negative electrode side in which the non-aqueous electrolyte is likely to flow out from the electrode due to the temperature rise as compared with the positive electrode side, the effect of the technique disclosed herein can be exhibited at a higher level.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
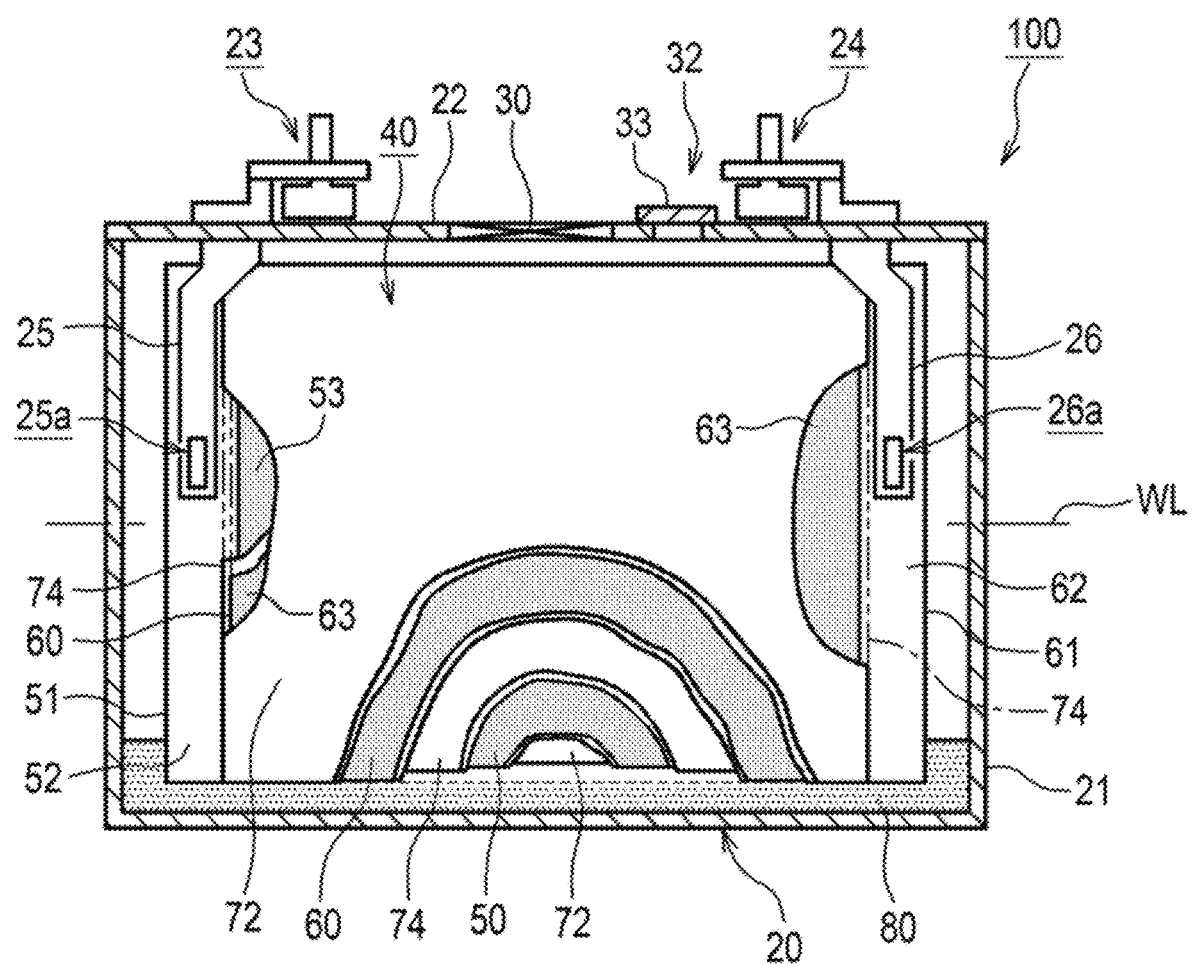
FIG. 1 is a cross-sectional view schematically showing a configuration of a non-aqueous electrolyte secondary battery according to an embodiment.

Hereinafter, a suitable embodiment of a non-aqueous electrolyte secondary battery disclosed herein will be described with reference to the drawings as appropriate, using a lithium-ion secondary battery as an example. Needless to say, the following embodiment is not intended to particularly limit the technique disclosed herein.

The non-aqueous electrolyte secondary battery disclosed herein is not limited to the lithium-ion secondary battery described below, and a sodium ion secondary battery, a magnesium ion secondary battery, or a lithium-ion capacitor (included in a so-called physical battery) is also a typical example included in the non-aqueous electrolyte secondary battery referred to here.

Further, although the lithium-ion secondary battery including a wound electrode body having a structure in which a plurality of electrode bodies of positive electrodes and negative electrodes are wound via a separator will be described here, the electrode body is not limited to such a configuration, and may have a configuration in which the electrode bodies of the positive electrodes and the negative electrodes are stacked via the separator.

Matters other than those specifically mentioned in the present specification, and needed for carrying out the present disclosure can be grasped as design matters of those skilled in the art based on the related art in the field. The present disclosure can be carried out based on the contents disclosed in the present specification and common general technical knowledge in the field.

Further, in a case where the numerical range is described as A to B (here, A and B are any numerical values) in the present specification, it means A or more and B or less.

In the drawings below, the members and the portions that perform the same effects are designated by the same reference numerals, and duplicate descriptions may be omitted or simplified. Further, the dimensional relationship (length, width, and the like) in the drawings below does not always reflect the actual dimensional relationship, and does not limit the configuration of the secondary battery at all.

In the present specification, the term "swellable resin" refers to a resin in which a specific thermal capacity is increased by absorbing a non-aqueous electrolyte used in the non-aqueous electrolyte secondary battery. For example, there is a resin in which the specific thermal capacity is increased as compared with before the resin swells the non-aqueous electrolyte in a case where the resin swells the non-aqueous electrolyte obtained by mixing ethylene carbonate (EC), ethyl methyl carbonate (EMC), and dimethyl carbonate (DMC) at a volume ratio of 30:40:30, and dissolving $LiPF_6$ as a supporting salt at a concentration of 1.0 mol/L. The swelling with the non-aqueous electrolyte can be performed, for example, by immersing the resin in the non-aqueous electrolyte at room temperature for about several tens of minutes to several hours.

In the present specification, "substantially formed of swellable resin" means the resin portion mainly formed of the swellable resin, and a trace component is allowed to be mixed as long as the effects of the present disclosure are not significantly impaired. Further, the swellable resin that forms the resin portion is not limited to one type, and the resin portion may be formed of a plurality of types. A content ratio of the swellable resin in the resin portion is, for example, preferably 90% by weight or more, more preferably 95% by weight or more, and still more preferably 98% by weight or more.

In the present application, the specific thermal capacity is represented by the specific thermal capacity at 25° C. measured based on a differential scanning calorimetry (DSC) method. The measurement is carried out in a dry nitrogen atmosphere, sapphire ($Al_2O_3$) is used as a standard sample, and an aluminum vessel is used as a sample vessel. The specific thermal capacity of the resin before and after being swelling the non-aqueous electrolyte can be measured by using a sample weight before swelling the non-aqueous electrolyte.

Figure 2:
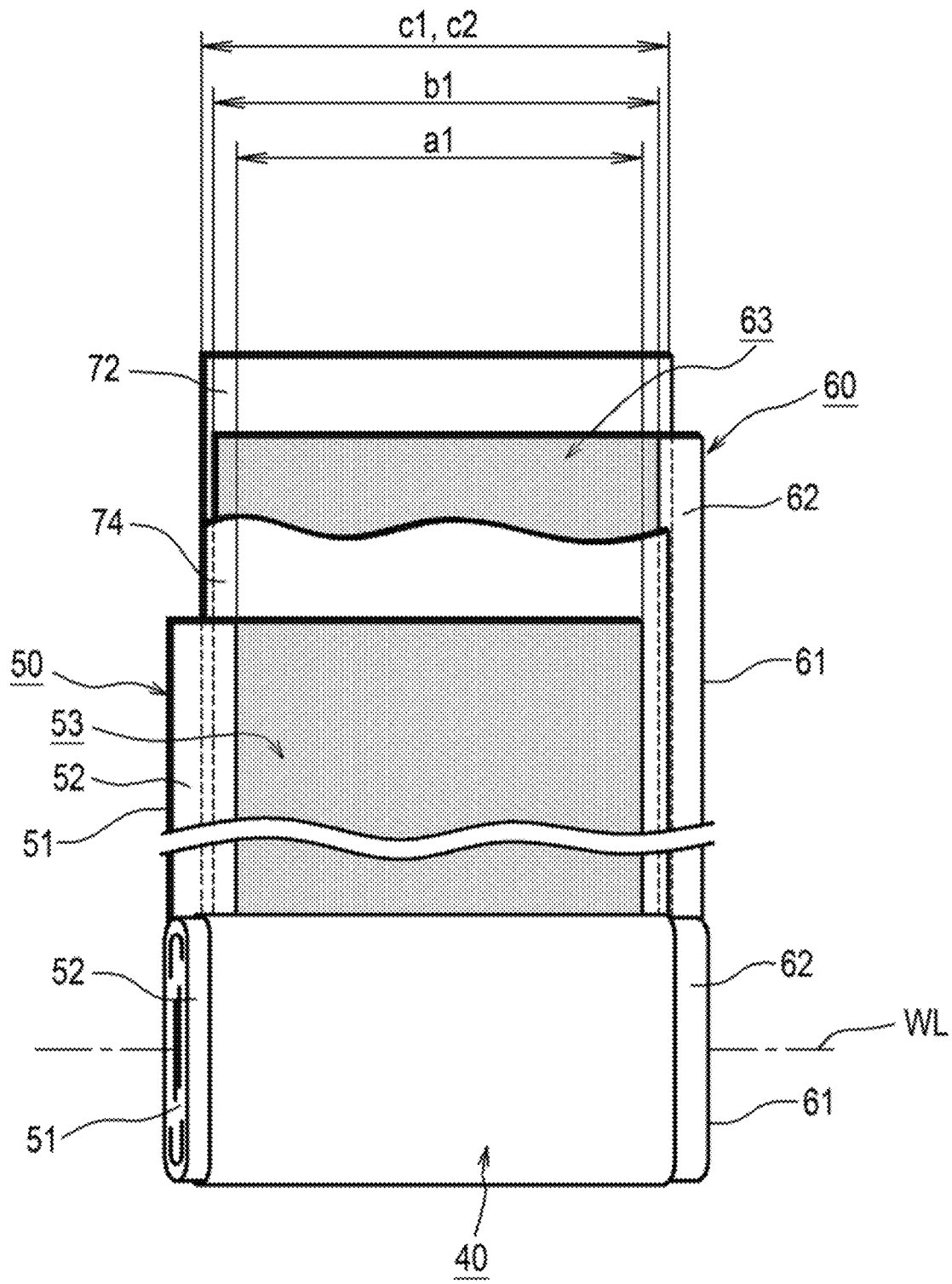
FIG. 2 is a schematic view showing an example of a configuration of a wound electrode body of the non-aqueous electrolyte secondary battery according to the embodiment.
Figure 3:
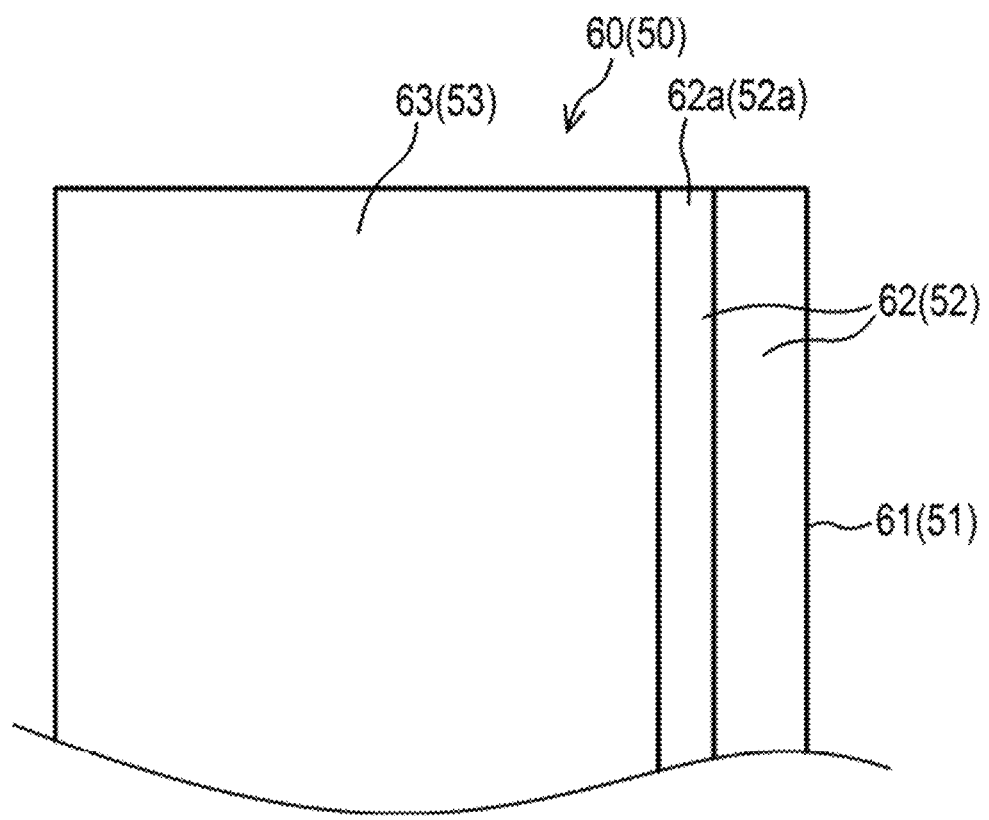
FIG. 3 is a plan view schematically showing configurations of a positive electrode and a negative electrode of the non-aqueous electrolyte secondary battery according to the embodiment.

Schematic diagrams of the lithium-ion secondary battery according to the embodiment are shown in FIGS. 1 to 3. As shown in FIG. 1, a lithium-ion secondary battery 100 has a configuration in which a flat wound electrode body 40 is accommodated in a flat square battery case 20 together with a non-aqueous electrolyte 80 as shown in FIG. 2. At least a part of the non-aqueous electrolyte 80 is impregnated in the wound electrode body 40. As shown in FIG. 3, at least any one of a positive electrode 50 and a negative electrode 60 that configure the wound electrode body 40 includes a resin portion 62a (52a) in a part of a mixture layer non-forming portion 62 (52).

As shown in FIG. 1, the battery case 20 that configures the lithium-ion secondary battery 100 has a case main body 21 having an opening and a lid 22 for closing the opening. The lid 22 is provided with a positive electrode terminal 23 and a negative electrode terminal 24 for external connection, and a safety valve 30 that has a thin wall and is set to release an internal pressure of the battery case 20 in a case where the internal pressure rises a predetermined level or more. The positive electrode terminal 23 and the negative electrode terminal 24 are electrically connected to a positive electrode current collector plate 25 and a negative electrode current collector plate 26, respectively. Examples of the material of the battery case 20 include a lightweight metal material having good thermal conductivity, such as aluminum.

The lithium-ion secondary battery 100 having such a configuration can be constructed by, for example, accommodating the wound electrode body 40 inside through the opening of the case main body 21, attaching the lid 22 to the opening, injecting an appropriate amount of the non-aqueous electrolyte 80 into the battery case 20 through the liquid injection port 32, and then sealing the liquid injection port 32 with a sealing material 33. The positive electrode current collector plate 25 and the negative electrode current collector plate 26 are respectively welded to a positive electrode current collector 51 and a negative electrode current collector 61 by resistance welding, ultrasonic welding, or the like. In FIG. 1, reference numerals 25a, 26a each indicate the welded portion.

As shown in FIG. 2, the wound electrode body 40 has a configuration in which the sheet-shaped positive electrode 50 in which a positive electrode mixture layer 53 is formed on one side or both sides of the long positive electrode current collector 51 along a longitudinal direction and the sheet-shaped negative electrode 60 in which a negative electrode mixture layer 63 is formed on one side or both sides of the long negative electrode current collector 61 along the longitudinal direction are overlapped with each other via two long separators 72, 74 and wound in the longitudinal direction. Further, the wound electrode body 40 includes the positive electrode mixture layer non-forming portion 52 and the negative electrode mixture layer non-forming portion 62 to protrude outward from both ends of a winding axis WL.

Normally, a width b1 of the negative electrode mixture layer 63 is designed to be wider than a width a1 of the positive electrode mixture layer 53. Further, normally, widths c1, c2 of the separators 72, 74 are designed to be wider than the width b1 of the negative electrode mixture layer 63 (c1, c2>b1>a1).

As shown in FIG. 3, in at least one of the positive electrode 50 and the negative electrode 60, the mixture layer non-forming portion has the resin portion substantially formed of the swellable resin having a property of swelling the non-aqueous electrolyte. By disposing the swellable resin in the mixture layer non-forming portion, the thermal capacity of the end portion of the electrode body can be increased, and the temperature rise of the end portion of the electrode body can be suppressed. As a result, the non-aqueous electrolyte is suitably held in the electrode body, and the high rate resistance of the lithium-ion secondary battery 100 can be improved.

As the positive electrode current collector 51 and the positive electrode mixture layer 53 that configure the positive electrode 50, the same positive electrode current collector and positive electrode mixture layer used in the lithium-ion secondary battery in the related art can be used without particular limitation.

Examples of the positive electrode current collector 51 include aluminum foil. Examples of a positive electrode active material contained in the positive electrode mixture layer 53 include a lithium transition metal oxide ($LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like) and a lithium transition metal phosphate compound ($LiFePO_4$ and the like). The positive electrode mixture layer 53 can contain components other than the active material, such as a conductive material or a binder. As the conductive material, for example, carbon black, such as acetylene black (AB), or other carbon materials (graphite and the like) can be suitably used. As the binder, polyvinylidene fluoride (PVDF), an acrylic binder, polyvinylpyrrolidone (PVP), and the like can be used. As the solvent, water or a mixed solvent mainly formed of water can be preferably used, and N-methyl-2-pyrrolidone (NMP) and the like is suitably used.

A pasty positive electrode mixture (hereinafter referred to as "positive electrode mixture paste") can be prepared by mixing the positive electrode active material, the conductive material, the binder, and the solvent as described above by using a known mixing device. Examples of the mixing device include a planetary mixer, a homogenizer, clearmix, filmix, a bead mill, a ball mill, an extrusion kneader and the like. Further, in the present specification, "paste" is used as a term including the form called "slurry" and "ink".

The application of the positive electrode mixture paste to the positive electrode current collector 51 can be performed according to a known method. For example, the application can be performed by using a coating device, such as a gravure coater, a comma coater, a slit coater, or a die coater.

The positive electrode mixture layer 53 can be formed by drying the applied positive electrode mixture paste by a known method. Specifically, the positive electrode mixture layer 53 can be formed by drying the positive electrode current collector 51 coated with the positive electrode mixture paste in a hot air drying furnace, an infrared drying furnace, or the like.

As the negative electrode current collector 61 and the negative electrode mixture layer 63 that configure the negative electrode 60, the same negative electrode current collector and negative electrode mixture layer used in the lithium-ion secondary battery in the related art can be used without particular limitation.

Examples of the negative electrode current collector 61 include copper foil. Examples of the negative electrode active material contained in the negative electrode mixture layer 63 include a carbon material, such as graphite, hard carbon, or soft carbon is used. Among the above examples, graphite is preferable. The graphite may be natural graphite or artificial graphite, or may be coated with an amorphous carbon material. The negative electrode mixture layer 63 can contain components other than the active material, such as a binder or a thickener. As the binder, styrene-butadiene rubber (SBR) and the like can be used. As the thickener, carboxymethyl cellulose (CMC) and the like can be used. As the solvent, an aqueous solvent is preferably used. The aqueous solvent need only have aqueous as a whole, and water or the mixed solvent mainly formed of water can be preferably used.

A pasty negative electrode mixture (hereinafter referred to as "negative electrode mixture paste") can be prepared by mixing the negative electrode active material, the conductive material, the binder, and the solvent as described above by using a known mixing device. Examples of the mixing device include a planetary mixer, a homogenizer, clearmix, filmix, a bead mill, a ball mill, an extrusion kneader and the like.

The application of the negative electrode mixture paste to the negative electrode current collector 61 can be performed according to a known method. For example, the application can be performed by using a coating device, such as a gravure coater, a comma coater, a slit coater, or a die coater.

The negative electrode mixture layer 63 can be formed by drying the applied negative electrode mixture paste by a known method. Specifically, the negative electrode mixture layer 63 can be formed by drying the negative electrode current collector 61 coated with the negative electrode mixture paste in a hot air drying furnace, an infrared drying furnace, or the like.

The resin portions (positive electrode side resin portion 52a and negative electrode side resin portion 62a) that can be formed on the positive electrode current collector 51 and the negative electrode current collector 61 are substantially formed of the swellable resin described above. As the swellable resin contained in the resin portion, a resin that has an excellent swelling property and a high thermal capacity can be preferably used. As the swellable resin, polyvinylpyrrolidone (PVP), SBR, an acrylic resin and the like can be used, but the swellable resin is not limited to this. As the acrylic resin, for example, the acrylic binder that can be used as the binder for the non-aqueous electrolyte secondary battery can be used.

The resin portion according to the present embodiment is substantially formed of the swellable resin described above, but may contain other components as long as the effects of the present disclosure are not significantly impaired.

The resin portion can be formed by, for example, mixing the swellable resin in the aqueous solvent, applying the mixed solvent to the mixture layer non-forming portion (at least any one of positive electrode mixture layer non-forming portion 52 and negative electrode mixture layer non-forming portion 62), and drying the applied solvent.

The thermal capacity of the negative electrode side resin portion 62a that can be formed on the negative electrode current collector 61 is not particularly limited as long as the effects of the present disclosure are exhibited, but is, per unit weight (kg) of the negative electrode mixture layer 63, preferably 5 J/(kg·K) or more, more preferably 10 J/(kg·K) or more, still more preferably 20 J/(kg·K). Further, the thermal capacity of the negative electrode side resin portion 62a is normally 50 J/(kg·K) or less per unit weight (kg) of the negative electrode mixture layer 63.

A weight of the negative electrode side resin portion 62a that can be formed on the negative electrode current collector 61 is not particularly limited as long as the effect of the disclosure is exhibited, but is normally 10% or less of the weight of the positive electrode mixture layer 53, for example, 5% or less, and more than 0%, for example, 0.1% or more.

The thermal capacity of the positive electrode side resin portion 52a that can be formed on the positive electrode current collector 51 is not particularly limited as long as the effects of the present disclosure are exhibited, but is, per unit weight (kg) of the positive electrode mixture layer 53, preferably 5 J/(kg·K) or more, more preferably 10 J/(kg·K) or more, still more preferably 20 J/(kg·K) or more. Further, the thermal capacity of the positive electrode side resin portion 52a is normally 50 J/(kg·K) or less per unit weight (kg) of the positive electrode mixture layer 53.

A weight of the positive electrode side resin portion 52a that can be formed on the positive electrode current collector 51 is not particularly limited as long as the effect of the disclosure is exhibited, but is normally 10% or less of the weight of the positive electrode mixture layer 53, for example, 5% or less, and more than 0%, for example, 0.1% or more.

The cycle resistance can be improved even in a case where the resin portion is provided on any of the positive electrode 50 and the negative electrode 60, but in a case where the resin portion is provided on any one of the positive electrode 50 and the negative electrode 60, the resistance increase rate after application of the cycle can be more suitably suppressed in a case where the resin portion is provided on the negative electrode 60 side. Although not particularly limited, one of the reasons why the cycle resistance can be further improved by providing the resin portion on the negative electrode 60 side as compared with the positive electrode 50 side is considered that the non-aqueous electrolyte 80 is likely to flow out from the electrode due to the temperature rise in the negative electrode 60 as compared with the positive electrode 50. That is, consideration is made that the effect of suppressing the outflow of the electrolyte is high by suppressing the temperature rise on the negative electrode 60 side.

It is preferable that the resin portion be formed along the mixture layer. By disposing the resin portion as described above, the temperature unevenness at the end portion of the electrode body can be reduced and the thermal capacity of the end portion of the electrode body can be more uniformly improved. As a result, the non-aqueous electrolyte 80 can be more suitably held in the electrode body 40, and the high rate resistance of the lithium-ion secondary battery 100 can be improved.

As the separators 72, 74, a porous sheet (film) made of polyolefin, such as polyethylene (PE) or polypropylene (PP), is suitably used. Such a porous sheet may have a single layer structure or a stacked structure of two or more layers (for example, a three layer structure in which the PP layers are stacked on both sides of the PE layer). A heat resistant layer (HRL) may be provided on the surfaces of the separators 72, 74.

Then, the wound electrode body 40 is manufactured by winding the positive electrode 50, the negative electrode 60, and the separators 72, 74 described above according to a known method. Specifically, the wound electrode body 40 can be manufactured by winding a stacked body in which the positive electrode 50 and the negative electrode 60 are overlapped with each other via two separators 72, 74 in the longitudinal direction with the axis WL as a winding axis, and pressing and bending the stacked body to be flat in one direction orthogonal to the winding axis WL.

Typically, the non-aqueous electrolyte 80 contains a non-aqueous solvent and a supporting salt.

As the non-aqueous solvent, various organic solvents, such as carbonates, ethers, esters, nitriles, sulfones, and lactones that are used in the electrolyte of a general lithium secondary battery can be used without particular limitation. Specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyldifluoromethyl carbonate (F-DMC), and trifluorodimethyl carbonate (TFDMC). Such a non-aqueous solvent can be used alone, or two or more types thereof can be used in combination as appropriate.

As the supporting salt, for example, a lithium salt, such as $LiPF_6$, $LiBF_4$, and $LiClO_4$ (preferably, $LiPF_6$), can be suitably used. A concentration of the supporting salt is preferably 0.7 mol/L or more and 1.3 mol/L or less.

In the lithium-ion secondary battery 100 configured as described above, deterioration due to repeated charging and discharging can be suppressed, and the battery performance can be further maintained for a long period of time. The lithium-ion secondary battery 100 can be used for various applications. Examples of the suitable applications include the power source for driving mounted on the vehicle, such as the electric vehicle (EV), the hybrid vehicle (HV), and the plug-in hybrid vehicle (PHV).

Next, the suitable embodiment will be described below with reference to examples, but the present disclosure is not intended to be limited to such examples.

Manufacturing of Lithium-Ion Secondary Battery for Evaluation

Preparation of Paste and Swellable resin Mixture

The positive electrode mixture paste was prepared by mixing $LiNi_{1/3}Co_{1/3}Mn_{1/3}O_2$ (LNCM) as the positive electrode active material, acetylene black (AB) as the conductive material, and polyvinylidene fluoride (PVdF) as the binder with N-methylpyrrolidone (NMP) at a mass ratio of LNCM: AB:PVdF=87:10:3.

The negative electrode mixture paste was prepared by mixing natural graphite-based carbon material (C) as the negative electrode active material, styrene-butadiene rubber (SBR) as the binder, and carboxymethyl cellulose (CMC) as the thickener with ion-exchanged water with a mass ratio of C:SBR:CMC=98:1:1. Polyvinylpyrrolidone (PVP) as the swellable resin was mixed with ion-exchanged water at a mass ratio of 10% to prepare a PVP solution.

Manufacturing of Electrode

Example 1

The positive electrode that has the positive electrode mixture layer was manufactured by applying the positive electrode mixture paste to the aluminum foil and drying the applied paste.

The negative electrode that has the negative electrode mixture layer was manufactured by applying the negative electrode mixture paste to the copper foil and drying the applied paste.

Example 2

The positive electrode having the positive electrode mixture layer was manufactured by applying the positive electrode mixture paste to the aluminum foil and drying the applied paste.

The negative electrode that has the negative electrode mixture layer and the negative electrode side resin portion was manufactured by applying the negative electrode mixture paste and the PVP solution to the copper foil and drying the applied paste. The PVP solution was applied such that the thermal capacity of the negative electrode side resin portion was 5 J/(kg·K) per unit weight (kg) of the negative electrode mixture layer.

Examples 3 to 8

The positive electrode and the negative electrode were manufactured in the same manner as in Example 2 except that the PVP solution was applied such that the thermal capacity of the negative electrode side resin portion was the value shown in Table 1.

Example 9

The positive electrode and the negative electrode were manufactured in the same manner as in Example 2 except that the applied amounts of the negative electrode mixture paste and the PVP solution were 1.2 times the applied amounts in Example 3.

Example 10

The positive electrode and the negative electrode were manufactured in the same manner as in Example 2 except that the applied amounts of the negative electrode mixture paste and the PVP solution were 1.2 times the applied amounts in Example 6.

Example 11

The positive electrode that has the positive electrode mixture layer and the positive electrode side resin portion was manufactured by applying the positive electrode mixture paste and the PVP solution to the aluminum foil and drying the applied paste. The PVP solution was applied such that the thermal capacity of the positive electrode side resin portion was 20 J/(kg·K) per unit weight (kg) of the positive electrode mixture layer.

The negative electrode having the negative electrode mixture layer was manufactured by applying the negative electrode mixture paste to the copper foil and drying the applied paste.

Manufacturing of Non-Aqueous Electrolyte

A non-aqueous electrolyte for testing was manufactured by mixing ethylene carbonate (EC), ethyl methyl carbonate (EMC), and dimethyl carbonate (DMC) at a volume ratio of 30:40:30, and dissolving $LiPF_6$ as the supporting salt at a concentration of 1.0 mol/L.

Manufacturing of Lithium-Ion Secondary Battery

Lithium-ion secondary batteries were respectively constructed by using the electrodes (positive electrode and negative electrode) of Examples 1 to 11, two separator sheets, and the non-aqueous electrolyte. As the separator sheet, a separator sheet having a three layer structure made of PP/PE/PP was used.

Specifically, the positive electrode, the negative electrode, and the separator sheet were overlapped with each other, wound, and pressed from the side to manufacture the flat wound electrode body. In this case, the two separator sheets were disposed such that the surface on which the heat resistant porous layer was formed faced the positive electrode mixture layer. Then, the wound electrode body was accommodated in the box-shaped battery case made of aluminum, the non-aqueous electrolyte was injected through an injection hole of the battery case, and then the injection hole was sealed. As described above, the lithium-ion secondary batteries respectively provided with the electrodes of Examples 1 to 11 were manufactured.

Charge and Discharge Cycle Test

The lithium-ion secondary batteries of Examples 1 to 11 were subjected to a charge and discharge cycle test in which charging and discharging were repeated at a high rate. Specifically, in an environment of 25° C., a high rate charge and discharge cycle in which discharging is performed for 150 seconds with a fixed current of 2 C, resting is performed for 10 seconds, charging is performed for 10 seconds with a fixed current of 30 C, and resting is performed for 10 seconds was repeated 1000 times.

By using an IV resistance (initial resistance of battery) before the charge and discharge cycle test and an IV resistance after the charge and discharge cycle test, the resistance increase rate (%) was calculated by Equation 1 below.

resistance increase rate (%)=(IV resistance after charge and discharge cycle test−IV resistance before charge and discharge cycle test)/IV resistance before charge and discharge cycle test× 100    Equation 1:

Further, the resistance increase rate (%) of each of Examples 2 to 11 with respect to the resistance increase rate of Example 1 was calculated by Equation 2 below. Table 1 shows the results.

resistance increase rate (%) with respect to resistance increase rate of Example 1=resistance increase rate calculated by Equation 1/resistance increase rate of Example 1 calculated by Equation 1×100    Equation 2:

Here, "1C" means an amount of current that can charge a battery capacity (Ah) predicted from the theoretical capacity of the positive electrode in one hour. For the IV resistances before and after the charge and discharge cycle was obtained by the inclination obtained by adjusting the battery to SOC 60%, and charging the battery at 1 C, 3 C, and 5 C respectively for 10 seconds in an environment of 25° C., and plotting a voltage drop value ΔV that is a value obtained by subtracting a voltage value at 10 seconds from an initial voltage value on a vertical axis by using the measured current value as the horizontal axis.

TABLE 1

| Example | Electrode in which resin portion (resin layer) is formed | Thermal capacity J/(kg · K) of resin portion per unit weight of mixture layer | Resistance increase rate after 1000 cycles (ratio with Example 1 as 100%) |
|---|---|---|---|
| 1 | Without forming | 0 | 100% |
| 2 | Negative electrode | 5 | 98% |
| 3 | Negative electrode | 10 | 96% |
| 4 | Negative electrode | 13 | 95% |
| 5 | Negative electrode | 16 | 94% |
| 6 | Negative electrode | 20 | 87% |
| 7 | Negative electrode | 25 | 78% |
| 8 | Negative electrode | 28 | 73% |
| 9 | Negative electrode | 10 | 95% |
| 10 | Negative electrode | 20 | 88% |
| 11 | Positive electrode | 20 | 93% |

As shown in Table 1, as compared with the lithium-ion secondary battery of Example 1 that does not have the resin portion in the positive electrode and the negative electrode, the lithium-ion secondary batteries of Examples 2 to 11 having the resin portion in the positive electrode or the negative electrode had a low resistance increase rate after the high rate charge and discharge cycle (hereinafter, simply referred to as the "resistance increase rate"). It can be seen that the increase in resistance can be suppressed by disposing the swellable resin in the mixture layer non-forming portion.

Further, in Examples 1 to 8, the resistance increase rate was decreased as the thermal capacity of the resin portion with respect to the unit weight of the mixture layer was increased. It can be seen that the increase in resistance can be more suitably suppressed by increasing the amount of the swellable resins to be disposed and increasing the thermal capacity of the resin portion. In the comparison between Example 3 and Example 9 and the comparison between Example 6 and Example 10, in a case where the thermal capacity of the resin portion was the same, the resistance increase rate did not change much even in a case where the weight changed. It can be seen that the resistance increase rate is largely contributed by the thermal capacity of the resin portion.

In the comparison between Example 6 and Example 11, the resistance increase rate was low in a case where the resin portion was provided on the negative electrode side as compared with a case where the resin portion was provided on the positive electrode side. It can be seen that in a case where the resin portion is provided on any one of the positive electrode side and the negative electrode side, the effect of decreasing the resistance increase rate is high in a case where the resin portion is provided on the negative electrode side as compared with a case where the resin portion was provided on the positive electrode side.

From the above, with the lithium-ion secondary battery disclosed herein, the resistance increase rate after the high rate charge and discharge cycle can be suppressed, and the high rate resistance can be improved.

Specific examples of the present disclosure have been described in detail above, but these examples are merely examples and do not limit the scope of claims. The disclosures disclosed herein include various modifications and changes of the specific examples.

What is claimed is:

1. A non-aqueous electrolyte secondary battery comprising:
    an electrode body that has a structure in which a plurality of positive electrodes and negative electrodes are stacked via a separator; and
    a non-aqueous electrolyte, wherein:
    the positive electrode includes a positive electrode current collector and a positive electrode mixture layer provided on a surface of the positive electrode current collector in a stacking direction;
    the positive electrode mixture layer is configured such that a mixture containing a positive electrode active material is formed therein, the positive electrode mixture layer having a positive non-forming portion in which the mixture containing the positive electrode active material is not formed;
    the negative electrode includes a negative electrode current collector and a negative electrode mixture layer disposed on a surface of the negative electrode current collector in a stacking direction;
    the negative electrode mixture layer is configured such that a mixture containing a negative electrode active material is formed therein, the negative electrode mixture layer having a negative non-forming portion in which the mixture containing the negative electrode active material is not formed; and
    at least one of the positive non-forming portion and the negative non-forming portion has a resin portion substantially formed of a swellable resin having a property of swelling the non-aqueous electrolyte.

2. The non-aqueous electrolyte secondary battery according to claim 1, wherein the resin portion is formed along the corresponding mixture layer.

3. The non-aqueous electrolyte secondary battery according to claim 1, wherein a thermal capacity of the resin portion is 10 J/(kg·K) or more per unit weight of the corresponding mixture layer.

4. The non-aqueous electrolyte secondary battery according to claim 1, wherein the resin portion contains at least any one of polyvinylpyrrolidone, styrene-butadiene rubber, and an acrylic resin.

5. The non-aqueous electrolyte secondary battery according to claim 1, wherein the resin portion is formed at least in the negative non-forming portion.

* * * * *